(12) United States Patent
Chang et al.

(10) Patent No.: US 11,281,084 B2
(45) Date of Patent: Mar. 22, 2022

(54) ILLUMINATION SYSTEM WITH CRYSTAL PHOSPHOR MECHANISM AND METHOD OF OPERATION THEREOF

(71) Applicant: Optonomous Technologies Inc., Agoura Hills, CA (US)

(72) Inventors: Yung Peng Chang, Hsinchu (TW); Alan Wang, Taichung (TW); Kirk Huang, Taichung (TW); Mark Chang, Taichung (TW); Lion Wang, Hsinchu (TW); Andy Chen, Taichung (TW); Kenneth Li, Agoura Hills, CA (US)

(73) Assignee: Optonomous Technologies, Inc., Agoura Hills, CA (US)

( * ) Notice: Subject to any disclaimer, the term of this patent is extended or adjusted under 35 U.S.C. 154(b) by 177 days.

(21) Appl. No.: 16/509,085

(22) Filed: Jul. 11, 2019

(65) Prior Publication Data

US 2020/0026169 A1    Jan. 23, 2020

Related U.S. Application Data

(60) Provisional application No. 62/764,085, filed on Jul. 18, 2018.

(51) Int. Cl.
*G03B 21/14*    (2006.01)
*G03B 21/20*    (2006.01)
(Continued)

(52) U.S. Cl.
CPC ........... *G03B 21/204* (2013.01); *G03B 21/16* (2013.01); *G03B 21/2013* (2013.01);
(Continued)

(58) Field of Classification Search
CPC ........ G02B 17/08; H04N 9/31; H04N 9/3114; H04N 9/3158; H04N 9/3161; H04N 5/74;
(Continued)

(56) References Cited

U.S. PATENT DOCUMENTS 7,167,314 B2    1/2007    Lerner et al.
9,537,067 B2    1/2017    Brosche et al.
(Continued)

FOREIGN PATENT DOCUMENTS

WO    WO 2017157742 A1    9/2017

OTHER PUBLICATIONS

"PCT Search Report/Written Opinion for parent PCT/US2019/041379 application, dated Oct. 9, 2019, 19 pages."

*Primary Examiner* — William C. Dowling
(74) *Attorney, Agent, or Firm* — Charles A. Lemaire; Jonathan M. Rixen; Lemaire Patent Law Firm, P.L.L.C.

(57) ABSTRACT

An illumination system includes: a laser array assembly including: a laser configured to generate a laser light; a crystal phosphor waveguide, adjacent to the laser and in the laser light, configured to: generate of a luminescent light based on receiving the laser light, and direct the luminescent light away from a base end; and a compound parabolic concentrator (CPC), coupled to the crystal phosphor waveguide opposite the base end, configured to: collect the luminescent light from the crystal phosphor waveguide, project the luminescent light away from the crystal phosphor waveguide.

24 Claims, 8 Drawing Sheets

(51) Int. Cl.
    *H04N 9/31*        (2006.01)
    *G03B 21/16*      (2006.01)
(52) U.S. Cl.
    CPC ......... *H04N 9/3114* (2013.01); *H04N 9/3158* (2013.01); *H04N 9/3161* (2013.01)
(58) Field of Classification Search
    CPC .. G03B 21/14; G03B 21/204; G03B 21/2013; F21V 7/04; F21V 7/10; F21V 7/06; F21K 9/60; F21K 9/40
    See application file for complete search history.

(56) References Cited

U.S. PATENT DOCUMENTS

| | | | |
|---|---|---|---|
| 2007/0279914 A1* | 12/2007 | Rutherford | G03B 21/204 362/341 |
| 2010/0118276 A1 | 5/2010 | Li | |
| 2017/0315433 A1* | 11/2017 | Ronda | C04B 35/44 |
| 2019/0056546 A1* | 2/2019 | Vrehen | G02B 6/0068 |
| 2019/0191133 A1 | 6/2019 | Ostrow | |
| 2019/0194538 A1 | 6/2019 | Abe et al. | |
| 2019/0197883 A1 | 6/2019 | Camras et al. | |
| 2019/0199056 A1 | 6/2019 | Eichler et al. | |
| 2019/0199981 A1 | 6/2019 | Murakami | |
| 2020/0041885 A1* | 2/2020 | Peeters | F21S 41/151 |
| 2020/0209633 A1* | 7/2020 | Cornelissen | F21S 43/14 |

* cited by examiner

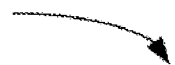

```
                    ┌─────────────────────────────────────────┐
                    │ RECEIVING A LASER LIGHT BY A CRYSTAL    │
                    │           PHOSPHOR WAVEGUIDE            │
                    │                  1302                   │
                    └─────────────────────────────────────────┘
                                        │
                    ┌─────────────────────────────────────────┐
                    │ DIRECTING THE LUMINESCENT LIGHT AWAY    │
                    │           FROM A REFLECTIVE LAYER       │
                    │                  1304                   │
                    └─────────────────────────────────────────┘
                                        │
                    ┌─────────────────────────────────────────┐
                    │ COLLECTING A LUMINESCENT LIGHT FROM     │
                    │       THE CRYSTAL PHOSPHOR WAVEGUIDE    │
                    │                  1306                   │
                    └─────────────────────────────────────────┘
                                        │
                    ┌─────────────────────────────────────────┐
                    │ PROJECTING THE LUMINESCENT LIGHT AWAY   │
                    │      FROM THE CRYSTAL PHOSPHOR WAVEGUIDE│
                    │                  1308                   │
                    └─────────────────────────────────────────┘
```

FIG. 13

ILLUMINATION SYSTEM WITH CRYSTAL PHOSPHOR MECHANISM AND METHOD OF OPERATION THEREOF

CROSS-REFERENCE TO RELATED APPLICATION

This application claims the benefit of U.S. Provisional Patent Application Ser. No. 62/764,085 filed Jul. 18, 2018, and the subject matter thereof is incorporated herein by reference thereto. This application claims the benefit of U.S. Provisional Patent Application Ser. No. 62/764,090 filed Jul. 18, 2018, and the subject matter thereof is incorporated herein by reference thereto.

TECHNICAL FIELD

An embodiment of the present invention relates generally to a lighting system, and more particularly to a system for generating high intensity luminescent light from crystal phosphor.

BACKGROUND

The most widely used light sources for projection systems, spotlights, and automotive headlights are discharge lamps. The discharge lamps can include mercury vapor lamps, metal halide lamps, high pressure sodium lamps, low pressure sodium lamps, or the like. The lighting systems that use the discharge lamps require fixtures that are physically large and able to dissipate the heat generated by an electric arc at the heart of the light. Over time, these lights can deteriorate to lose as much as 70% of their efficiency in light generated per Watt consumed. The discharge lamps are capable of high intensity output, but they also provide poor luminous efficacy. Discharge lamps also have the drawbacks of high-power requirements, short lifetime, high cost, and use of mercury which is an environmental hazard.

Thus, a need exists for an illumination system that provides improved light generation, reliability, and flexibility. In view of the ever-increasing commercial competitive pressures, along with growing consumer expectations and the diminishing opportunities for meaningful product differentiation in the marketplace, it is increasingly important to provide an illumination system that solves these problems. Additionally, the need to reduce costs, improve efficiencies and performance, and meet competitive pressures adds an even greater urgency to the necessity to provide an illumination system that addresses these problems.

Solutions to these problems have been long sought but prior developments have not taught or suggested any solutions and, thus, solutions to these problems have long eluded those skilled in the art.

SUMMARY

An embodiment of the present invention provides an apparatus, including an illumination system, including: a laser configured to generate a laser light; a crystal phosphor waveguide, adjacent to the laser and in the laser light, configured to: generate of a luminescent light based on receiving the laser light, and direct the luminescent light away from a base end; and a compound parabolic concentrator (CPC), coupled to the crystal phosphor waveguide opposite the base end, configured to: collect the luminescent light from the crystal phosphor waveguide, and project the luminescent light away from the crystal phosphor waveguide.

An embodiment of the present invention provides a method including: receiving a laser light, by a crystal phosphor waveguide, for generating of a luminescent light; directing the luminescent light away from a base end of the crystal phosphor waveguide; collecting the luminescent light from the crystal phosphor waveguide; and projecting the luminescent light away from the crystal phosphor waveguide.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 13 is a flow chart of a method of operation of an illumination system in an embodiment of the present invention.

DETAILED DESCRIPTION

Figure 1A:
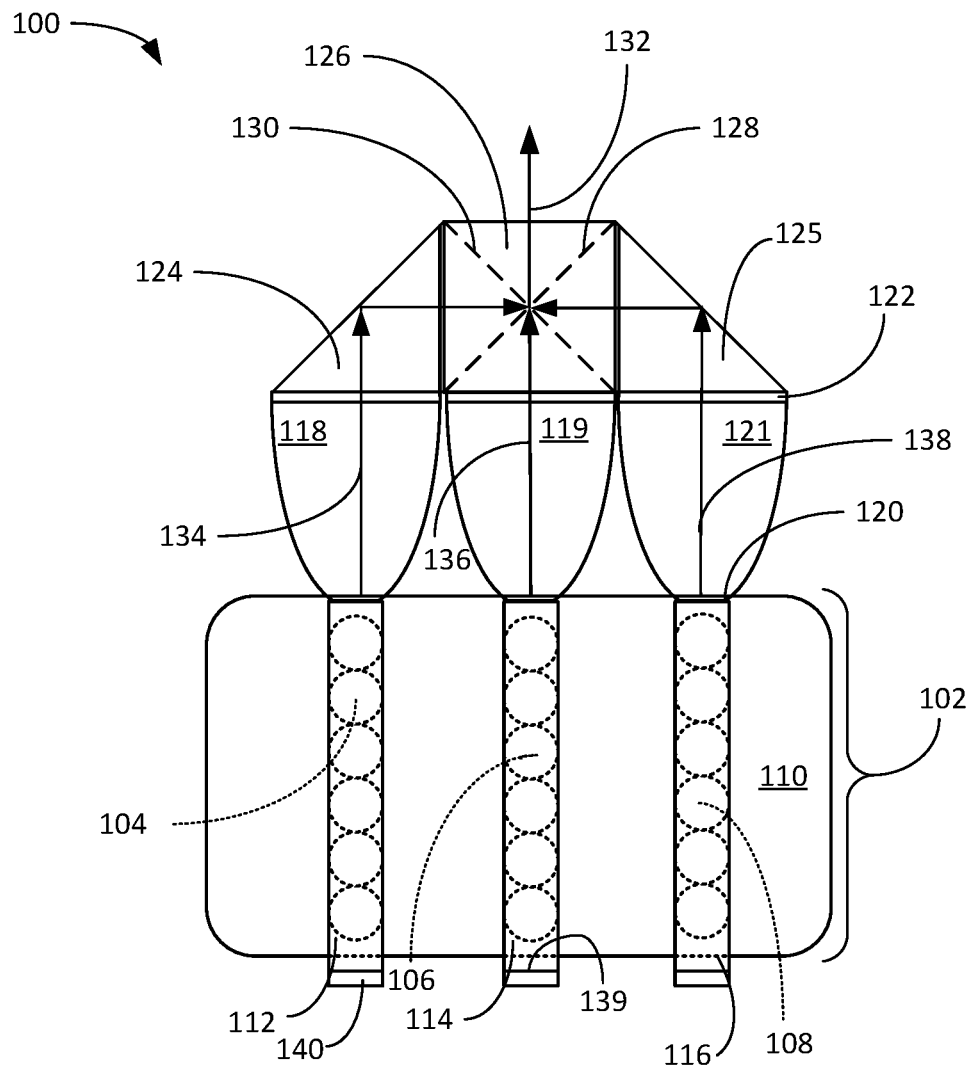
FIG. 1A is an example of a functional block diagram of an illumination system with crystal phosphor mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "adjacent" referred to herein can be defined as two elements in close proximity to each other. The term "on" referred to herein can be defined as two elements in physical contact with no intervening elements. The term "etendue" referred to herein can be defined as a property of light in an optical system, which characterizes how the light is distribute in area and angle, which determines the "brightness" of light produced by an optical structure. The term "pump" or "pumped" referred to herein can be defined as transferring energy from a laser source to a crystal phosphor structure to produce luminescent light from the incident laser light.

Referring now to FIG. 1A, therein is shown an example of a functional block diagram of an illumination system 100 with crystal phosphor mechanism in an embodiment of the present invention. The illumination system 100 is depicted as a laser array assembly 102, including a first laser array 104, a second laser array 106, a third laser array 108, and laser heat sink 110. The laser array assembly 102 can be a packaged structure that contains multiple laser diodes arranged in a matrix. The laser array assembly 102 can also include a collimating lens (not shown) over each laser in the first laser array 104, the second laser array 106, and the third laser array 108. A red crystal phosphor rod 112 can be positioned directly over the first laser array 104. A green crystal phosphor rod 114 can be positioned directly over the second laser array 106. A blue crystal phosphor rod 116 can be positioned directly over the third laser array 108. In an alternate embodiment (not shown), the blue crystal phosphor rod 116 could be replaced by a colorless diffuser rod 116 in which the blue laser light from the laser diodes entered into the colorless diffuser rod 116 will be scattered in all directions, similar to the light emitted by the blue phosphor in the blue crystal phosphor rod 116.

A compound parabolic concentrator (CPC) 118 can be coupled to each of the red crystal phosphor rod 112, the green crystal phosphor rod 114, and the blue crystal phosphor rod 116 by a joint 120 that can be made up of high index glue, gel, epoxy, direct bonding, or the like, such that the couplings are made to be efficient. The CPC 118 can be formed of a solid transparent polymer with a high index of refraction, such as but not limited to, acrylic polymers or polycarbonate-based polymers. Other materials used to produce the CPC 118 can be dielectric inorganic solids such as but not limited to, glasses, fused silica, and various transparent ceramics, like magnesium oxide, magnesium aluminate spinels, and aluminum oxynitrides. The CPC 118 can also be made hollow with a reflective surface formed in the compound parabolic concentrator shape. An air gap 122 can be formed between each of the CPC 118 and a turning prism 124 or an X-Cube 126. The turning prism 124 can have one or more of the five faces of the turning prism 124 optically polished on the light transmitting surfaces, which are then coated by an anti-reflection coating. The X-Cube 126 can be formed of four prisms, that when combined form a cube with a red reflective surface 128 and a blue reflective surface 130 formed diagonally through the X-Cube 126. The X-Cube 126 can have alone or more of the six faces optically polished and have the air gaps 122 between the X-Cube 126, the turning prism 124, and an additional turning prism 125.

To produce a multi-colored output 132, FIG. 1A shows an embodiment as an example using the red crystal phosphor rod 112, the green crystal phosphor rod 114, and the blue crystal phosphor rod 116 placed on the first laser array 104, the second laser array 106, and the third laser array 108, respectively, such that one laser array side pumps the red crystal phosphor rod 112, one linear array side pumps the blue crystal phosphor rod 116, and one linear array side pumps the green crystal phosphor rod 114. The red crystal phosphor rod 112 can be a single-crystalline structure formed of a reactive material, for producing a red color when activated. When the red crystal phosphor rod 112 is side pumped by the first laser array 104, an output of a red luminescent light 134 can be transmitted through the CPC 118, such as the first CPC 118. The green crystal phosphor rod 114 can be a single-crystalline structure formed of a reactive material, for producing a green color when activated. The side pumping of the green crystal phosphor rod 114 by the second laser array 106 can produce a green luminescent light 136 that is transmitted through a second CPC 119. The blue crystal phosphor rod 116 can be a single-crystalline structure formed of a reactive material, for producing a blue color when activated. The side pumping of the blue crystal phosphor rod 116 by the third laser array 108 can produce a blue luminescent light 138 that is transmitted through a third CPC 121. Again, the blue crystal phosphor rod 116 can be replaced by a colorless diffuser rod 116 as described above.

In this embodiment as an example, the first laser array 104, the second laser array 106, and the third laser array 108 are spaced apart by a distance such that the CPC 118 attached to the red crystal phosphor rod 112, the second CPC 119 attached to the green crystal phosphor rod 114, and a third CPC 121 attached to the blue crystal phosphor rod 116 are spaced apart and coupled without mechanical interference. Each of the red crystal phosphor rod 112, the green crystal phosphor rod 114, and the blue crystal phosphor rod 116 can have a base end 139 opposite the CPC 118 that can be selectively coated with a reflective layer 140. The sides, top and bottom of the red crystal phosphor rod 112, the green crystal phosphor rod 114, and the blue crystal phosphor rod 116 can be coated with the reflective layer 140 The reflective layer 140 can be defined as a material that can pass the laser light from the first laser array 104, the second laser array 106, and the third laser array 108 and reflect the red luminescent light 134 into the CPC 118, the green luminescent light 136 into the second CPC 119, and the blue luminescent light 138 into the third CPC 121.

As an example, the CPC 118 coupled to the red crystal phosphor rod 112 has an output directed into the turning prism 124 through the air gap 122 for proper wave guiding and total internal reflection operation. Similarly, the third CPC 121 coupled to the blue crystal phosphor rod 116 has an output directed into the additional turning prism 125 as shown. Both the turning prism 124 and the additional turning prism 125 are positioned adjacent to the X-Cube 126. The air gap 122 can be between the turning prism 124 and the X-Cube 126 as well as between the X-Cube 126 and the additional turning prism 125. The red luminescent light 134, the green luminescent light 136, and the blue luminescent light 138 are then combined by the X-Cube 126, in which the red luminescent light 134 and blue luminescent light 138 can be turned 90 degrees from their entry direction while the green luminescent light 136 passes directly through the X-Cube 126. The X-Cube 126 can be made up of four prisms that, when combined, form the cube. The red reflective surface 128 and the blue reflective surface 130 can be formed diagonally and coated with selective coating such that the red luminescent light 134, the green luminescent light 136, and the blue luminescent light 138 on the 3 sides will be combined into the multi-colored output 132 at the fourth side of the X-Cube. The multi-colored output 132, such as a red-green-blue (RGB) output can be coupled to the desired applications, such as, projectors, spotlights, entertainment lighting, etc.

In order to couple and direct the light efficiently, as an example the 5 faces of the turning prism 124 and the additional turning prism 125 can be optically polished with the light transmitting surfaces coated with an anti-reflection coating. The reflections within the turning prism 124 and the additional turning prism 125 are all total internal reflections without losses and with the end triangular faces also optically polished, the turning prism 124 and the additional turning prism 125 act as waveguides also. In addition, all six faces of the X-Cube 126 are optically polished and other than the top and bottom faces, all other four faces are anti-reflection coated. To allow the surfaces of the X-Cube 126 to have total internal reflections for efficient waveguiding of the red luminescent light 134, the green luminescent light 136, and the blue luminescent light 138, the air gap 122 between the turning prism 124 and the additional turning prism 125, the second CPC 119, and the X-Cube 126 are either filled with air or low index gel or glue such that total internal reflections occurs in all the optical surfaces of the turning prism 124, the additional turning prism 125, the second CPC 119, and the X-Cube 126.

The red crystal phosphor rod 112, the green crystal phosphor rod 114, and the blue crystal phosphor rod 116 can each be pumped from the side using a single laser array, such as the first laser array 104, the second laser array 106, or the third laser array 108. It is understood that by using two of the laser arrays, one placed on the top and one placed on the bottom, for pumping each of the red crystal phosphor rod 112, the green crystal phosphor rod 114, and the blue crystal phosphor rod 116, one from the top, and one from the bottom, additional intensity of the multi-colored output 132 can be produced. The heat sink 110 can be formed as a single compact package by extending the heat sink to cover the CPC 118, the turning prism 124, the additional turning prism 125, and the X-cube 126 such that the illumination system 100 can be formed inside a single, compact assembly.

Figure 1B:
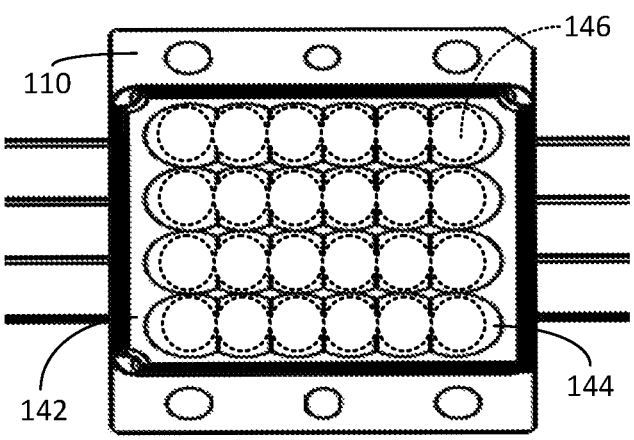
FIG. 1B is an example of a laser array of an illumination system with crystal phosphor mechanism in an embodiment.

Referring now to FIG. 1B, therein is shown an example of the laser array assembly 102 of the illumination system 100 with crystal phosphor mechanism in an embodiment. As an example, the laser array assembly 102 includes a collimating lens array 142 where each lens 144 is placed over each laser diode 146 such that the output of the laser diode 146 is collimated by the lens 144 as a parallel laser beam, not shown. For a typical laser array assembly 102 with a matrix of four by six of the laser diodes 146, the dimensions are in the range of 20 to 30 mm on each side. Dimensions of larger and smaller arrays are scaled accordingly.

The laser array assembly 102 includes an array of the laser diodes 146 for pumping, the collimating lens array 142, and the heat sink 110. By way of an example the laser array assembly 102 is shown having a four by six array of the laser diode 146 and the lens 144, but any array size can be configured.

It has been discovered that an embodiment of the illumination system 100 provides a compact waveguide path for the red luminescent light 134, the green luminescent light 136, and the blue luminescent light 138 to be mixed to form the multi-colored output 132. The illumination system 100 is more compact than a similar system composed of collimating lenses and dichroic beam combiners. By applying a reflective coating along the optical path, total internal reflections for efficient wave-guiding of the red luminescent light 134, the green luminescent light 136, and the blue luminescent light 138 can be achieved. The illumination system 100 can preserve the etendue of the red luminescent light 134, the green luminescent light 136, and the blue luminescent light 138 generated in the red crystal phosphor rod 112, the green crystal phosphor rod 114, and the blue crystal phosphor rod 116 respectively by controlling the flow of the red luminescent light 134, the green luminescent light 136, and the blue luminescent light 138 and preventing any loss (leaks) of the light generated within the illumination system 100. The illumination system 100 can efficiently produce a high intensity light source for the multi-colored output 132 that can be adapted to applications that include image or "goes before optics" (GOBO) projectors and entertainment spotlights, while still maintaining a small and compact size.

Figure 2:
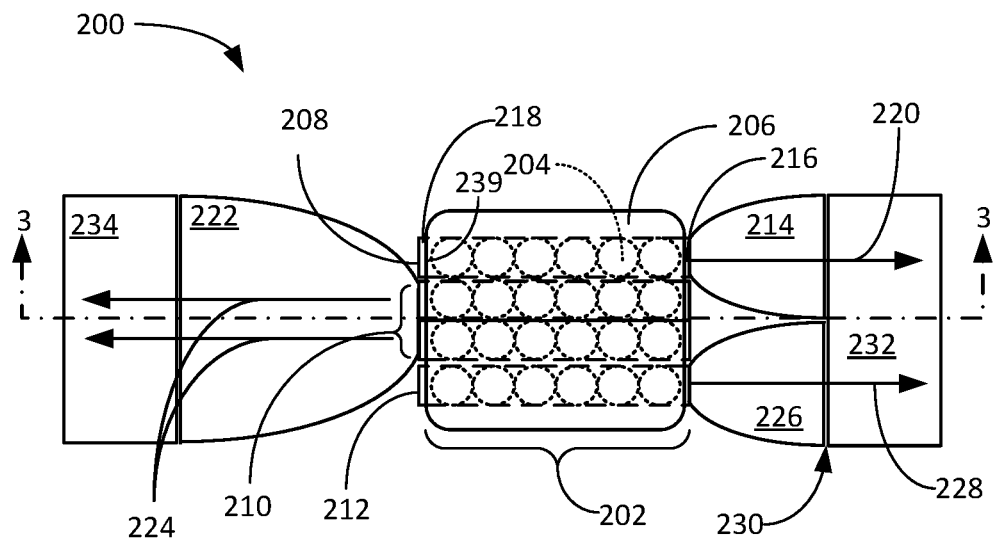
FIG. 2 is a top view of an example of an illumination system with crystal phosphor mechanism in an alternative embodiment.

Referring now to FIG. 2, therein is shown a top view of an example of an illumination system 200 with crystal phosphor mechanism in an alternative embodiment. The top view of the illumination system 200 depicts a laser array assembly 202 including lasers 204 arranged in a four by six arrangement that is positioned beneath a laser heat sink 206. A collimating lens (shown in FIG. 3) can be adjacent to the lasers 204. A red crystal phosphor rod 208 can be positioned below a first row of the lasers 204. A green crystal phosphor rod 210 can be positioned below each of a second row and a third row of the lasers 204. A blue crystal phosphor rod 212 can be positioned under a fourth row of the lasers 204. The blue crystal phosphor rod 212 can also be replaced by a colorless diffuser rod 212 in which the blue laser light is diffused and scattered producing a blue output similar to that of the blue crystal phosphor rod 212.

A first compound parabolic concentrator (CPC) 214 can be bonded to the red crystal phosphor rod 208 by a joint 216 that can be made up of high index glue, gel, epoxy, direct bonding or the like, such that the couplings are made to be efficient. A base end 239 of the red crystal phosphor rod 208 that is opposite the first CPC 214 can be coated with a reflective layer 218 of a material to reflect a red luminescent light 220 and any energy from the lasers 204 toward the first CPC 214. It is understood that the sides of the red crystal phosphor rod 208 that are not facing the lasers 204 can be coated with the reflective material of the reflective layer 218. By reflecting the energy back into the red crystal phosphor rod 208, a higher intensity of the red luminescent light 220 can be produced.

A second CPC 222 can be coupled to a pair of the green crystal phosphor rod 210 by the joint 216. The pair of the green crystal phosphor rod 210 can be positioned below the second row and third row of the lasers 204. The base end 239 of the green crystal phosphor rod 210 opposite the second CPC 222 can include the reflective layer 218 in order to reflect a green luminescent light 224 and any energy from the lasers 204 toward the second CPC 222. It is understood that the sides of the green crystal phosphor rod 210 that are not facing the lasers 204 can be coated with the reflective material of the reflective layer 218. By reflecting the energy back into the green crystal phosphor rod 210 a higher intensity of the green luminescent light 224 can be produced. The green crystal phosphor rods 210 can be configured to produce the green luminescent light 224 in a direction opposite the direction of the red luminescent light 220. This allows the geometry of the first CPC 214 and the second CPC 222 to be coupled directly to the red crystal phosphor rod 208 and the pair of the green crystal phosphor rod 210, respectively, without a mechanical interference between the first CPC 214 and the second CPC 222.

A third CPC 226 can be coupled to the blue crystal phosphor rod 212 by the joint 216. The third CPC 226 can be positioned adjacent to the first CPC 214 without creating any mechanical interference. Between the first CPC 214 and the third CPC 226. The blue crystal phosphor rod 212 can be positioned directly below the fourth row of the lasers 204. The base end 239 of the blue crystal phosphor rod 212 opposite the third CPC 226 can be coated with the reflective layer 218 in order to reflect a blue luminescent light 228 toward the third CPC 226. It is understood that the sides of the blue crystal phosphor rod 212 that are not facing the lasers 204 can be coated with the reflective material of the reflective layer 218. By reflecting the energy back into the blue crystal phosphor rod 212 a higher intensity of the blue luminescent light 228 can be produced. The blue crystal phosphor rod 212 can be configured to transmit the blue luminescent light 228 in the same direction as the red luminescent light 220.

The red luminescent light 220 and the blue luminescent light 228 can be transmitted through an air gap 230 between a turning prism 232 and the first CPC 214 and the third CPC 226. The air gap 230 can be either filled with air or low index gel or glue such that total internal reflections occurs in all the optical surfaces of the turning prism 232. To couple and turn the direction of the red luminescent light 220 and the blue luminescent light 228 efficiently, one or more of the five faces of the turning prism 232 can be optically polished with the light transmitting surfaces being anti-reflection coated. The reflections are all total internal reflections without losses. The end triangular faces may be optically polished, and the turning prism 232 may also act as a waveguide. The green luminescent light 224 can be transmitted in a direction opposite the red luminescent light 220 and the blue luminescent light 228 into a color-combining prism 234. The joining of the red luminescent light 220, the green luminescent light 224, and the blue luminescent light 228 is further explained in FIG. 3. A section line 3-3 shows the section and direction of viewing FIG. 3.

Figure 3:
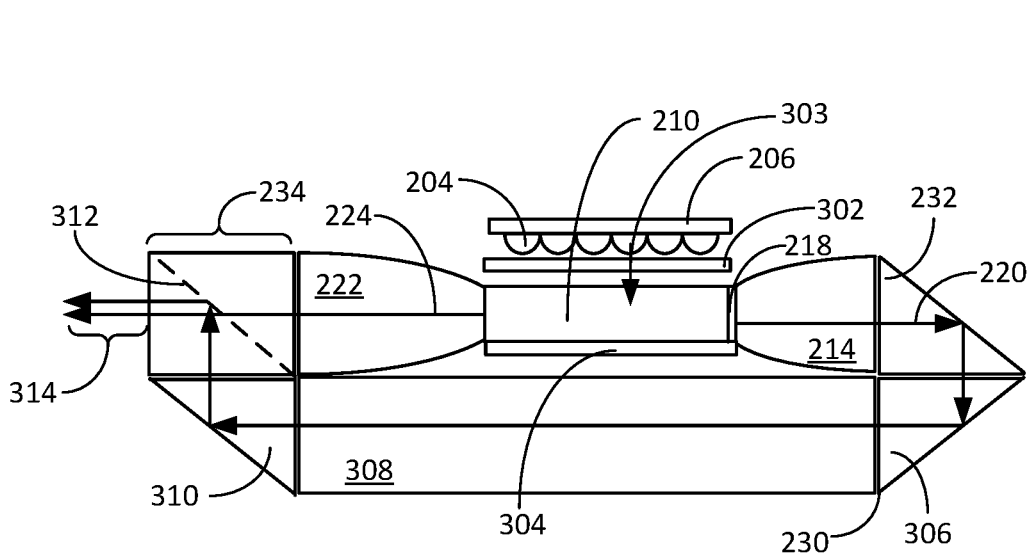
FIG. 3 is a side cross-sectional view of an illumination system with crystal phosphor mechanism along the section line 3-3 in the embodiment of FIG. 2.

Referring now to FIG. 3, therein is shown a side cross-sectional view of the illumination system 200 with crystal phosphor mechanism along the section line 3-3 in the embodiment of FIG. 2. The side cross-sectional view of the illumination system 200 depicts the lasers 204 mounted on the laser heat sink 206. The lasers 204 can have collimating lenses 302 attached or the collimating lenses 302 can be adjacent to the lasers 204. It is understood that the collimating lens 302 is also located between the lasers 204 and the red crystal phosphor rod 208 of FIG. 2 and the blue crystal phosphor rod 212 of FIG. 2, which are not shown in the cross-sectional view of FIG. 3. The collimating lens 302 can be integrated into the laser array assembly 202 of FIG. 2 as shown in FIG. 1B.

As an example, the reflective layer 218 is shown on the green crystal phosphor rod 210 in direct contact to a crystal phosphor heat sink 304. It is understood that the crystal phosphor heat sink 304 is in contact with the red crystal phosphor rod 208, the pair of the green crystal phosphor rod 210, and the blue crystal phosphor rod 212, which are not shown in the cross-sectional view of FIG. 3.

A second turning prism 306 can be positioned directly under the turning prism 232. The second turning prism can be constructed in the same fashion as the turning prism 232. The air gap 230 can be between the turning prism 232 and the second turning prism 306. The red luminescent light 220 can be transmitted through the turning prism 232 to turn 90 degrees and flow into the second turning prism 306. The red luminescent light 220 can be turned an additional 90 degrees in the second turning prism 306. The red luminescent light 220 can be transmitted through the air gap 230 into a waveguide 308. The waveguide 308 can consist of a square or rectangular core surrounded by a material or fluid with lower refractive index than that of the core. It is understood that the waveguide 308 can be a clear glass core that is optically polished and coated with a reflective material, such as the reflective layer 218.

The red luminescent light 220 can be transmitted through the waveguide 308 to a third turning prism 310. The third turning prism can be constructed like the turning prism 232 and the second turning prism 306. To couple and turn the red luminescent light 220 efficiently, one or more of the five faces of the turning prism 232, the second turning prism 306 and the third turning prism 310 can be optically polished with the light transmitting surfaces anti-reflection coated. The reflections within the turning prism 232, the second turning prism 306 and the third turning prism 310 are all total internal reflections without losses and with the end triangular faces may be optically polished, and the turning prism 232, the second turning prism 306 and the third turning prism 310 may also act as waveguides. To allow the surfaces to have total internal reflections for efficient waveguiding of the red luminescent light 220, the air gap 230 between the turning prism 232, the second turning prism 306 and the third turning prism 310, the waveguide 308, and the color-combining prism 234 are either filled with air or low index gel or glue such that total internal reflections occur in all the optical surfaces of the turning prism 232, the second turning prism 306 and the third turning prism 310, the waveguide 308, and the color-combining prism 234.

It is understood that the blue luminescent light 228 of FIG. 2 also follows the same optical path as the red luminescent light 220. A red and blue reflective layer 312 can be formed in the color-combining prism 234 that can turn the red luminescent light 220 and the blue luminescent light 228, while passing the green luminescent light 224. A multi-colored output 314 of all 3 colors are combined using a prism/waveguide system.

It has been discovered that the illumination system 200 can combine the red luminescent light 220, the green luminescent light 224, and the blue luminescent light 228 using a prism/waveguide system to produce the multi-colored output 314 in a very small space. By optically polishing the optical surfaces of the turning prism 232, the second turning prism 306 and the third turning prism 310, the waveguide 308, and the color-combining prism 234 a full waveguide path can be formed in a small space that preserves the etendue of the multi-colored output 314 throughout the optical path. Additionally, the particular embodiment of the illumination system 200 shown in FIG. 2 and FIG. 3 was chosen to have a pair of green crystal phosphor rods 210 because green light has a higher intensity than either red light or blue light and is not as significantly affected by the use of the CPC 222 having a larger area and divergence. The red luminescent light 220 and the blue luminescent light 228 cover half of the area of the green luminescent light 224 with the same divergences such that the green luminescent light 224 has twice the etendue of the red luminescent light 220 and blue luminescent light 228. This thereby assists in preserving the overall etendue of the multi-colored output 314 of the illumination system 200

Figure 4:
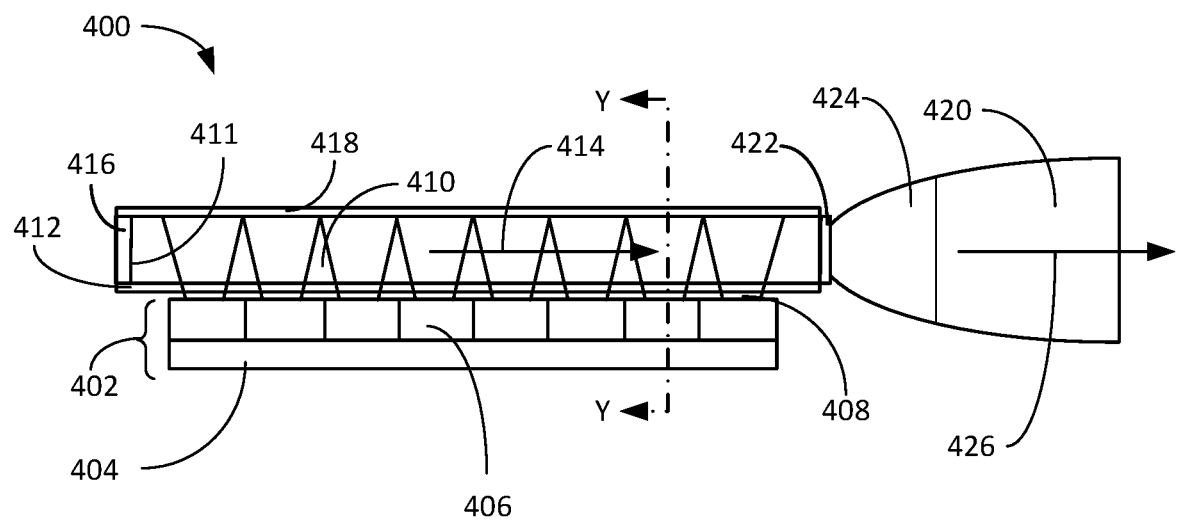
FIG. 4 is an example of a functional block diagram of an illumination system with crystal phosphor mechanism in yet another alternative embodiment.

Referring now to FIG. 4, therein is shown an example of a functional block diagram of an illumination system 400 with crystal phosphor mechanism in yet another alternative embodiment. The functional block diagram of the illumination system 400 depicts a laser array 402 including a laser heat sink 404 and lasers 406 mounted on the laser heat sink 404. The laser array 402 can produce a laser light 408 that can be applied to a crystal phosphor waveguide 410. The crystal phosphor waveguide 410 can be a crystal phosphor rod coated with transmissive reflective coating 412 such that the laser light 408, such as a blue laser light, will transmit into the crystal phosphor waveguide 410 and a luminescent light 414, such as a yellow luminescent light, generated within the crystal phosphor waveguide 410 will be reflected back into the crystal phosphor waveguide 410.

The crystal phosphor waveguide 410 can include a base end 411 that can be selectively coated with a reflective end layer 416 and a reflective side layer 418. The reflective end layer 416 and the reflective side layer 418 can both be a reflective metal, coating, ceramic, or the like that can reflect the luminescent light 414 back into the crystal phosphor waveguide 410. The crystal phosphor waveguide 410 can be coupled to a compound parabolic concentrator (CPC) 420 by a joint 422, The joint 422 can be made up of high index glue, gel, epoxy, direct bonding, or the like, such that the couplings of the luminescent light 414 are made to be efficient. The CPC 420 can include a CPC reflective layer 424 that can be a similar material to the reflective end layer 416. The CPC reflective layer 424 can reflect any of the luminescent light 414 that is greater than a critical angle of the CPC 420 back into an output luminescent light 426. The side-pumping of the crystal phosphor waveguide 410 can provide a high intensity of the output luminescent light 426.

It has been discovered that the illumination system 400 can produce high intensity of the output luminescent light 426 by capturing the laser light 408 and the luminescent light 414 within the crystal phosphor waveguide 410 and the CPC 420 as part of the generation of the output luminescent light 426. A section line Y-Y shows a section location and viewing direction for FIG. 8 and FIG. 9.

Figure 5:
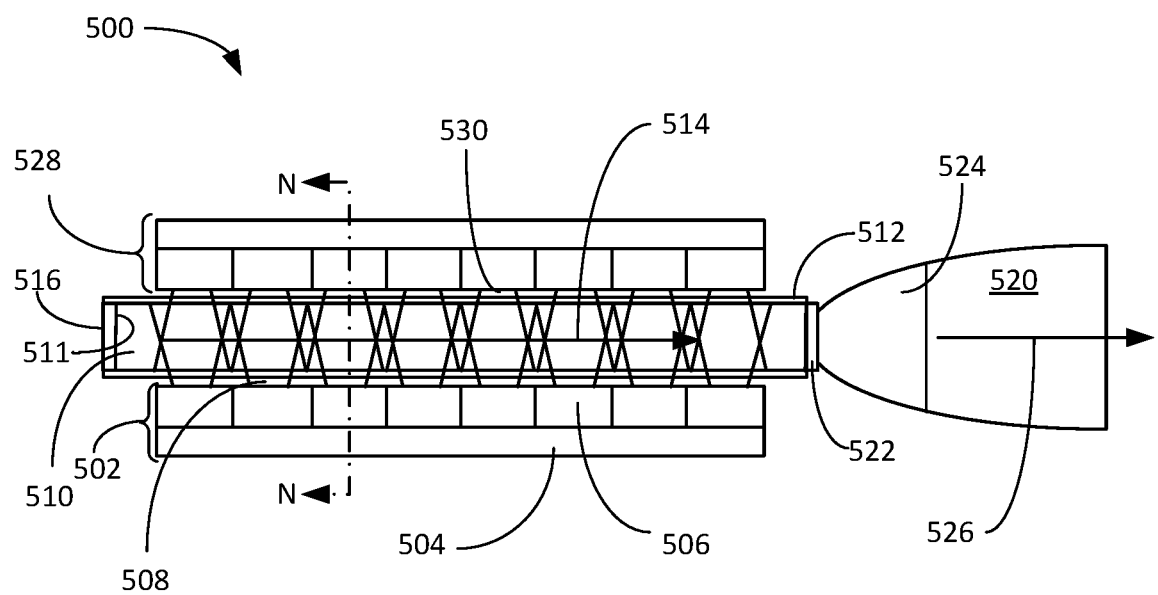
FIG. 5 is an example of a functional block diagram of an illumination system with double pumped crystal phosphor mechanism in an embodiment.

Referring now to FIG. 5, therein is shown an example of a functional block diagram of an illumination system 500 with double pumped crystal phosphor mechanism in an embodiment. The functional block diagram of the illumination system 500 depicts a laser array 502 including a laser heat sink 504 and lasers 506 mounted on the laser heat sink 504. The laser array 502 can produce a laser light 508 that can be applied to a crystal phosphor waveguide 510. The crystal phosphor waveguide 510 can be a crystal phosphor rod coated with a transmissive reflective coating 512 such that the laser light 508, such as a blue laser light, will transmit into the crystal phosphor waveguide 510 and a luminescent light 514, such as a yellow luminescent light, generated within the crystal phosphor waveguide 510 will be reflected back into the crystal phosphor waveguide 510.

An additional laser array 528 can be positioned above the crystal phosphor waveguide 510. The supplemental laser light 530 can enter the crystal phosphor waveguide 510 through the transmissive reflective coating 512 applied to the top of the crystal phosphor waveguide 510.

The crystal phosphor waveguide 510 can include a base end 511 that can be selectively coated with a reflective end layer 516. The reflective end layer 516 can be a reflective metal, coating, ceramic, or the like that can reflect the luminescent light 514 back into the crystal phosphor waveguide 510. The crystal phosphor waveguide 510 can be coupled to a compound parabolic concentrator (CPC) 520 by a joint 522, The joint 522 can be made up of high index glue, gel, epoxy, direct bonding, or the like, such that the couplings of the luminescent light 514 are made to be efficient. The CPC 520 can include a CPC reflective layer 524 that can be a similar material to the reflective end layer 516. The CPC reflective layer 524 can reflect any of the luminescent light 514 that is propagated at an angle greater than a critical angle of the CPC 520 back into an output luminescent light 526. The side-pumping of the crystal phosphor waveguide 510 can provide a high intensity of the output luminescent light 526.

It has been discovered that the illumination system 500 can produce high intensity of the output luminescent light 526 by capturing the laser light 508, the supplemental laser light 530, and the luminescent light 514 within the crystal phosphor waveguide 510 and the CPC 520 as part of the generation of the output luminescent light 526. The additional laser array 528 can enable a dual mode of operation. By activating only one of the laser array 502 or the additional laser array 528, a low power mode of operation can be achieved. If both the laser array 502 and the additional laser array 528 are both activated, a high-power mode can be achieved. The high-power mode of the illumination system 500 can approximately double the intensity output of the crystal phosphor waveguide 510 without consuming additional space, by positioning the additional laser array 528 within the space of the heat sink. A section line N-N shows the position and direction of viewing the cross-section views of both FIG. 6 and FIG. 7 below.

Figure 6:
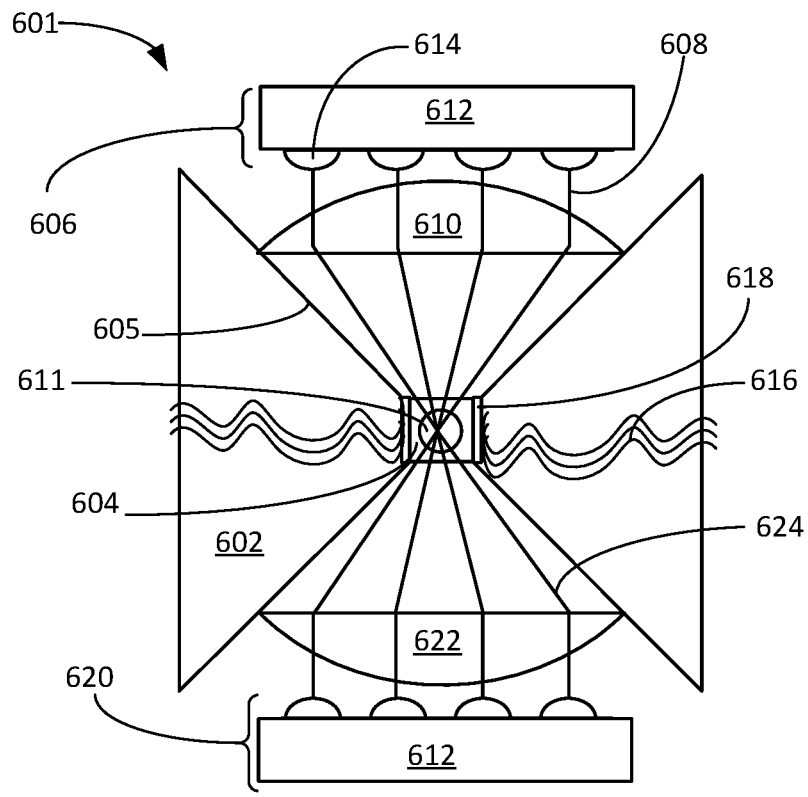
FIG. 6 is a cross-sectional view of an example configuration of an illumination heat sink attached to a crystal phosphor waveguide as viewed from section line N-N, of FIG. 5.

Referring now to FIG. 6, therein is shown is a cross-sectional view of an example configuration of one embodiment of an illumination heat sink 602 attached directly to, or through a thermal medium 618, a crystal phosphor waveguide 604 as viewed from section line N-N, of FIG. 5. The cross-sectional view depicts a laser array 606, shown as a 2-dimensional array multi-device package (MDP), is focused at the crystal phosphor waveguide 604 as a line of laser light 608 using a focusing lens 610, such as a cylindrical lens of glass, fused silica, or clear ceramic material. The focusing lens 610 can be long enough to extend beyond the laser array 606. The illumination heat sink 602 can have a reflective surface 605 configured to reflect the laser light 608 onto the crystal phosphor waveguide 604. The illumination heat sink 602 can be formed of any thermally conductive material, such as metal, glass, ceramic, or the like, configured to draw heat 616 away from the crystal phosphor waveguide 604. The crystal phosphor waveguide 604 can be a crystal phosphor rod coated with blue transmissive reflective coating (not shown) such that the laser light 608, such as a blue laser light, will transmit into the crystal phosphor waveguide 604 and a luminescent light 611, shown as a circle, such as a yellow luminescent light generated within the crystal phosphor waveguide 604 will be reflected back into the crystal phosphor waveguide 604.

The laser array 606 can include a laser heat sink 612 and lasers 614 arranged in a 2-dimensional array. The laser light 608 can cause the crystal phosphor waveguide 604 to generate the luminescent light 611, emanating out of the page, and the heat 616 that can be drawn from the crystal phosphor waveguide 604 through a thermal medium 618, such as indium foil, thermal epoxy, silica gel, or the like. The thermal medium 618 can be compressed between and in contact with both the crystal phosphor waveguide 604 and the illumination heat sink 602.

An additional laser array 620 can be positioned below the crystal phosphor waveguide 604. A second focusing lens 622 can be identical to the focusing lens 610. The additional laser array 620 can generate a supplemental laser light 624 that is focused on the crystal phosphor waveguide 604 through the second focusing lens 622. By implementing the additional laser array 620, the amount of the luminescent light 611 generated within the crystal phosphor waveguide 604 can be maximized. In a low power mode, only one of the laser array 606 or the additional laser array 620 is used to activate the crystal phosphor waveguide 604 for generating more of the luminescent light 611. In a high-power mode, both the laser array 606 and the additional laser array 620 are activated for generating more of the luminescent light 611. The increased energy from the laser array 606 and the additional laser array 620 can generate a much higher intensity of the luminescent light 611. It has been discovered that the transfer of the heat 616 through the thermal medium 618 and the illumination heat sink 602 advantageously accommodates the use of higher power modes which significantly increase the intensity of the luminescent light 611 output from the illumination system without damaging the crystal phosphor waveguide 604.

The top and bottom of the crystal phosphor waveguide 604 are coated with blue transmissive reflective coating, such that the laser light 608 and the supplemental laser light 624, such as the blue laser light, will transmit into the crystal phosphor waveguide 604 and the luminescent light 611, such as a yellow light, from the crystal phosphor waveguide 604 will be reflected back into the crystal phosphor waveguide 604. The illumination heat sink 602 is placed on the vertical sides of the crystal phosphor waveguide 604 to draw the heat 616 from the crystal phosphor waveguide 604 through the thermal medium 618.

It is understood that the illumination heat sink 602 can extend along the entire length (not shown) of the crystal phosphor waveguide 604 and is thermally coupled to the crystal phosphor waveguide 604 using the thermal medium 618, such as indium foils. A length of the crystal phosphor waveguide 604, such as a crystal phosphor rod, and the length of the focusing lens 610 is chosen to be equal to or longer than the length of the laser array 606 that provides the laser light 608. It is further understood that the heat sink 612 and the heat sink 602 can be thermally connected to become an integrated heat sink facilitating heat removal from the system.

It has been discovered that the illumination system 500 can provide increased intensity of the luminescent light 611 by enabling the use of all lasers 614 of the laser array 606 and the additional laser array 620 in high-power modes without damaging the crystal phosphor waveguide 604. The illumination heat sink 602 can dissipate the heat 616 generated by the generation of the increased intensity of the luminescent light 611 and prevent the crystal phosphor waveguide from cracking or breaking under the additional load caused by the laser light 608 and the supplemental laser light 624.

Figure 7:
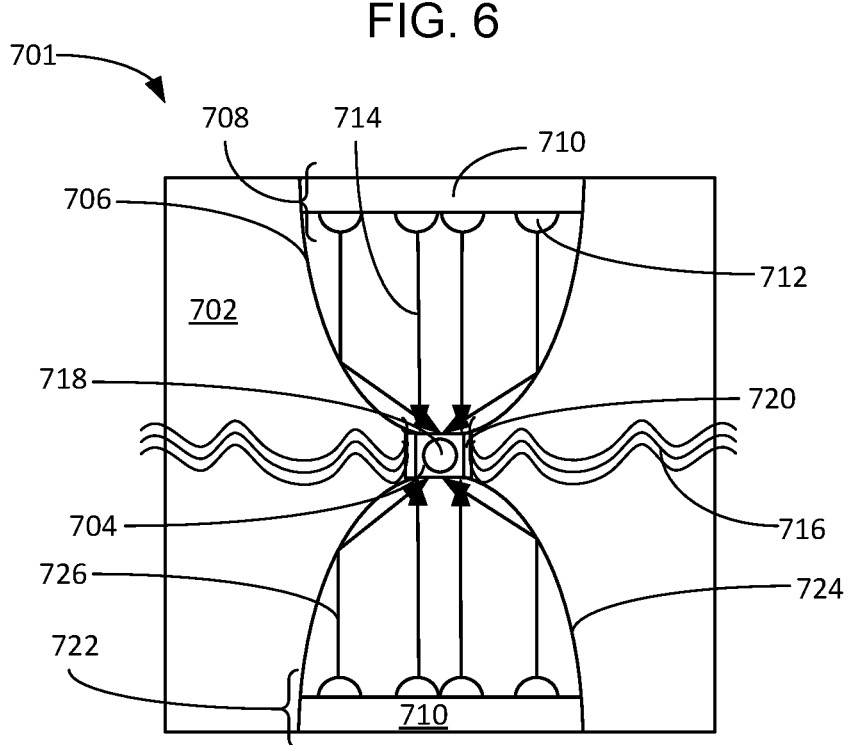
FIG. 7 is a cross-sectional view of an example configuration of an illumination heat sink attached to a crystal phosphor waveguide as viewed from section line N-N, of FIG. 5.

Referring now to FIG. 7, therein is shown a cross-sectional view of an example configuration of an illumination heat sink 702 adjacent to a crystal phosphor waveguide 704 as viewed from section line N-N, of FIG. 5. The cross-sectional view of an example configuration of the illumination heat sink 702 depicts a longitudinal concave reflector 706 formed in the illumination heat sink 702. The longitudinal concave reflector 706 can be a polished portion of the illumination heat sink 702 formed in the shape of a compound parabolic concentrator (CPC) 706. The longitudinal concave reflector 706 can have an upper opening configured to accept a laser array assembly 708 that can extend into the longitudinal concave reflector 706. The laser array assembly 708 can include a laser heat sink 710 and lasers 712 attached below the laser heat sink 710.

The laser array assembly 708 can generate a laser light 714 that can project into the longitudinal concave reflector 706 and be directed on a top edge of the crystal phosphor waveguide 704. The application of the energy from the laser light 714 can cause the crystal phosphor waveguide 704 to produce heat 716 and a luminescent light 718 that projects out of the page as is indicated by the circle in the crystal phosphor waveguide 704. The heat 716 is the result of the conversion of the laser light 714 into the luminescent light 718 within the crystal phosphor waveguide 704. The heat 716 can be drawn from the crystal phosphor waveguide 704 through a thermal medium 720, such as indium foil, thermal epoxy, silica gel, or the like. The thermal medium 720 can be compressed between and in contact with both the crystal phosphor waveguide 704 and the illumination heat sink 702.

An additional laser array 722 can be positioned below the crystal phosphor waveguide 704. A second longitudinal concave reflector 724 can be identical to the longitudinal concave reflector 706. The additional laser array 722 can generate a supplementary laser light 726 that is focused on the crystal phosphor waveguide 704 through the second longitudinal concave reflector 724. By implementing the additional laser array 722, the amount of the luminescent light 718 generated within the crystal phosphor waveguide 704 can be maximized. In a low power mode, only one of the laser array assembly 708 or the additional laser array 722 is used to activate the crystal phosphor waveguide 704 for generating the luminescent light 718. In a high-power mode, both the laser array assembly 708 and the additional laser array 722 are activated for generating the luminescent light 718. The increased energy from the laser array assembly 708 and the additional laser array 722 can generate a higher intensity of the luminescent light 718. The transfer of the heat 716 through the thermal medium 720 and the illumination heat sink 702 can allow the increase in intensity of the luminescent light 718 without damaging the crystal phosphor waveguide 704.

The longitudinal concave reflector 706 and the second longitudinal concave reflector 724 are used to focus the laser light 714 and the supplementary laser light 726 into a line on the crystal phosphor waveguide 704 through reflections within the longitudinal concave reflector 706 and the second longitudinal concave reflector 724. Although multiple reflections can occur in the r longitudinal concave reflector 706 and the second longitudinal concave reflector 724, to minimize loss, the longitudinal concave reflector 706 and the second longitudinal concave reflector 724 are preferably designed and formed to allow only one reflection before converging on the crystal phosphor waveguide 704. The shape of the longitudinal concave reflector 706 and the second longitudinal concave reflector 724 can include parabolic, circular, triangular, but preferably they form a compound parabolic concentrator (CPC). The longitudinal concave reflector 706 and the second longitudinal concave reflector 724 can be made as part of the illumination heat sink 702, which can reduce the component count and lowering the cost of the illumination system. The laser array assembly 708 and the additional laser array 722 are mounted in the illumination heat sink 702 to simplifying the design of the structure and lower the cost of manufacturing.

It has been discovered that the illumination heat sink 702 can provide a low power mode of operation and a high-power mode of operation by activating the laser array assembly 708, the additional laser array 722, or a combination thereof. The increased energy delivered by the laser light 714 and the supplementary laser light 726 can increase the intensity of the luminescent light 718, while the thermal medium 720 and the illumination heat sink 702 protect the crystal phosphor waveguide 704 from damage due to excessive amounts of the heat 716. The illumination heat sink 702 can also dissipate the heat 716 from the laser heat sink 710 in both the laser array assembly 708 and the additional laser array 722.

Figure 8:
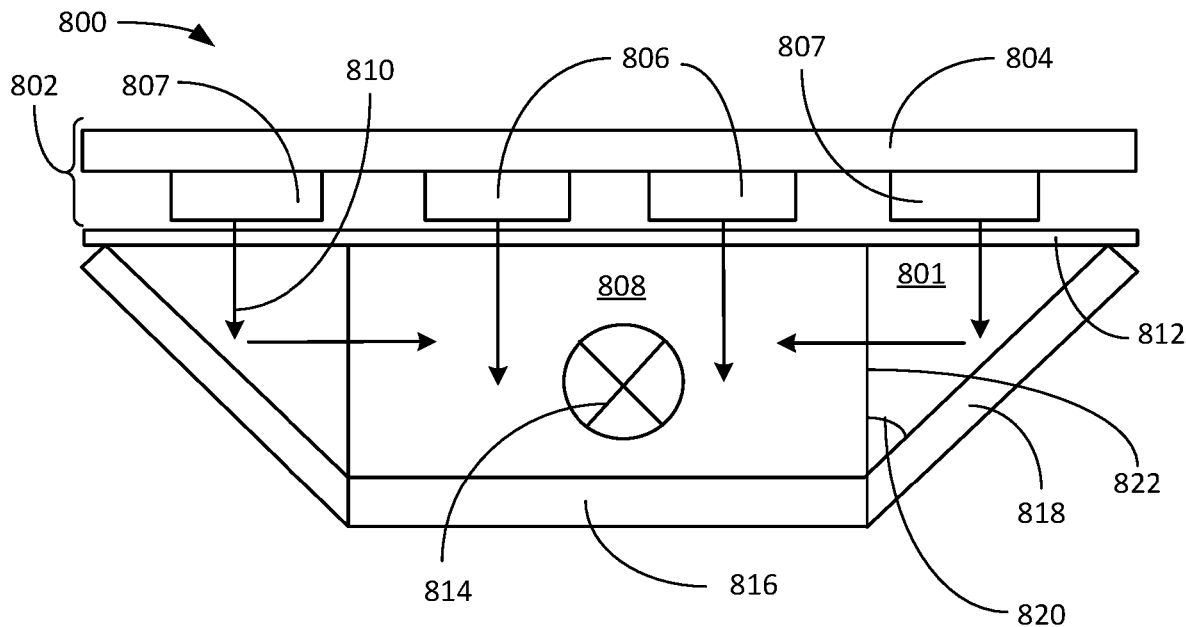
FIG. 8 is a cross-sectional view of an example configuration of an illumination system with crystal phosphor mechanism in an alternative embodiment as viewed from section line Y-Y, of FIG. 4.

Referring now to FIG. 8, therein is shown a cross-sectional view of an example configuration of an illumination system 800 with crystal phosphor mechanism in an alternative embodiment as viewed from section line Y-Y, of FIG. 4. The cross-sectional view of an example configuration of the illumination system 800 depicts an array of lasers 802 including a heat sink 804 with inner lasers 806 and outboard lasers 807 mounted thereon.

A crystal phosphor waveguide 808, such as a crystal phosphor rod, can be positioned under the central two of the inner lasers 806. Each of the inner lasers 806 can produce a laser light 810, such as a blue laser light. An input filter 812 can pass the laser light 810 having high energy, while reflecting the luminescent light 814, shown as a circle with an "X" transmitted out of the page. A reflective layer 816 can be deposited on the edge of the crystal phosphor waveguide 808, opposite the array of lasers 802, to reflect back any of the laser light 810 and the luminescent light 814 that might be reflected toward the outer edge of the crystal phosphor waveguide 808. The reflective layer 816 can also be part of a heat sink structure (not shown) that can conduct the heat away from the crystal phosphor waveguide 808.

The outboard lasers 807 that are not positioned over the crystal phosphor waveguide 808 utilize a mirror 818, positioned at an angle 820 such as 45 degrees relative to a side 822 of the crystal phosphor waveguide 808, to reflect the laser light 810 into the side of the crystal phosphor waveguide 808 that is perpendicular to the filter 812 when the angle 820 is chosen to be 45 degrees or other angles that maximizes the output of the system. The addition of the laser light 810 from the outboard lasers 807 and increase the intensity of the luminescent light 814. It is understood that the illumination system 800 can significantly increase the output of the luminescent light 814 by the addition of the laser light 810 from the outboard lasers 807 so as to pump the crystal phosphor waveguide 808 from three sides. It is understood that the array of lasers 802 can be a structure populated with 2-dimensional laser arrays rather than the inner lasers 806. In order to compensate for the additional power provided to the crystal phosphor waveguide 808, the reflective layer 816 can be an illumination heat sink that can also dissipate energy through the mirrors 818. It is also understood that the reflective layer 816 and the mirrors 818 can be integrated into a single reflector, which can be metal-formed, molded glass, or the like. The integrated single reflector can be made up of flat surfaces, curve surfaces, or a combination of different surfaces for maximum coupling efficiency. The integrated reflector can also be an integral part of a heat sink for conducting heat away from the crystal phosphor waveguide 808.

Figure 9:
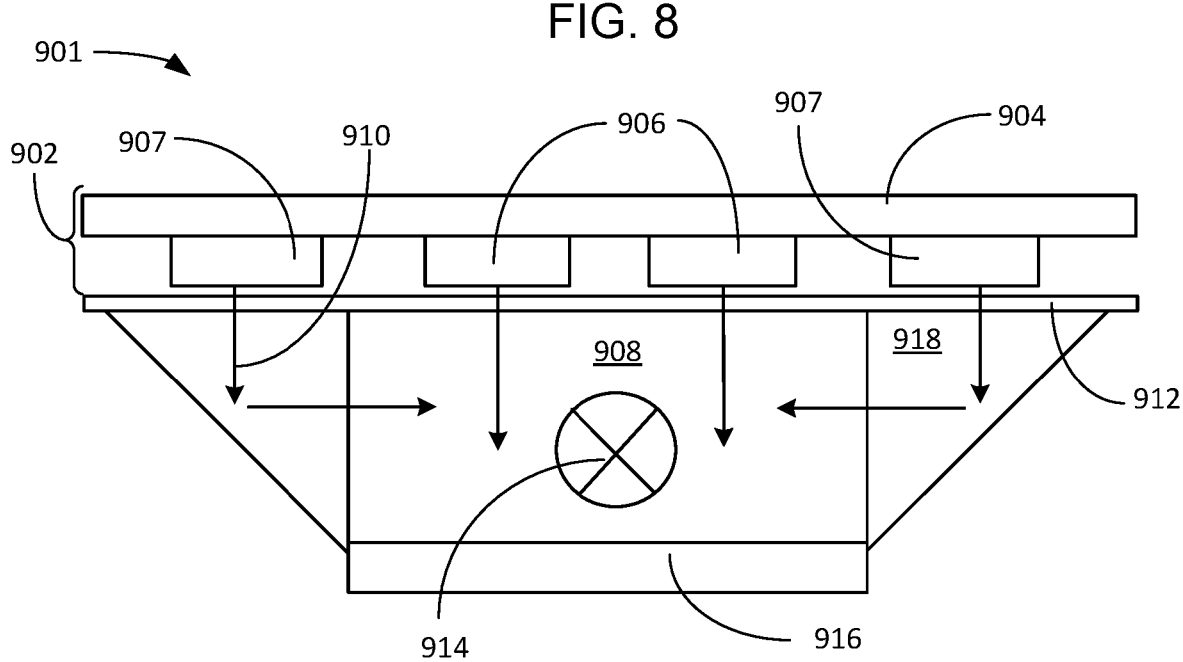
FIG. 9 is a cross-sectional view of an example configuration of an illumination system with crystal phosphor mechanism in another alternative embodiment as viewed from section line Y-Y, of FIG. 4.

Referring now to FIG. 9, therein is shown a cross-sectional view of an example configuration of an illumination system 900 with crystal phosphor mechanism in another alternative embodiment as viewed from section line Y-Y, of FIG. 4. The cross-sectional view of the illumination system 900 depicts an array of lasers 902 including a laser heat sink 904 with inner lasers 906 and outboard lasers 907 mounted thereon. It is understood that the inner lasers 906 and outboard lasers 907 can each be implemented with a 2-dimentional laser arrays or as single lasers as the inner lasers 906.

A crystal phosphor waveguide 908, such as a crystal phosphor rod, can be positioned under the central two of the inner lasers 906. Each of the inner lasers 906 can produce a laser light 910, such as a blue laser light. An input filter 912 can pass the laser light 910 having high energy, while blocking reflections of the laser light 910 and a luminescent light 914, shown as a circle with an "X" transmitted out of the page. A reflective layer 916 can be deposited on the edge of the crystal phosphor waveguide 908, opposite the array of the lasers 902, to reflect back any of the laser light 910 or the luminescent light 914 that might be reflected toward the outer edge of the crystal phosphor waveguide 908. The reflective layer 916 can also be part of a heat sink structure (not shown) that can conduct the heat away from the crystal phosphor waveguide 908.

The outboard lasers 907 that are not positioned over the crystal phosphor waveguide 908 can project their laser light 910 into a turning prism 918 positioned on either side of the crystal phosphor waveguide 908. alone or more of the five faces of the turning prism 918 can be optically polished on the light transmitting surfaces, which are then coated by an anti-reflection coating. The turning prism 918 can reflect the laser light 910 from the outboard lasers 907 into the sides of the crystal phosphor waveguide 908 to further boost the production of the luminescent light 914.

It has been discovered that the illumination system 900 can produce high intensity of the luminescent light 914 by pumping the crystal phosphor waveguide 908 on three sides by using the turning prism 918. The total output power of the illumination system 900 can be increased by implementing the laser heat sink 904 populated with 2-dimentional laser arrays for the inner lasers 906 and the outboard lasers 907.

Figure 10:
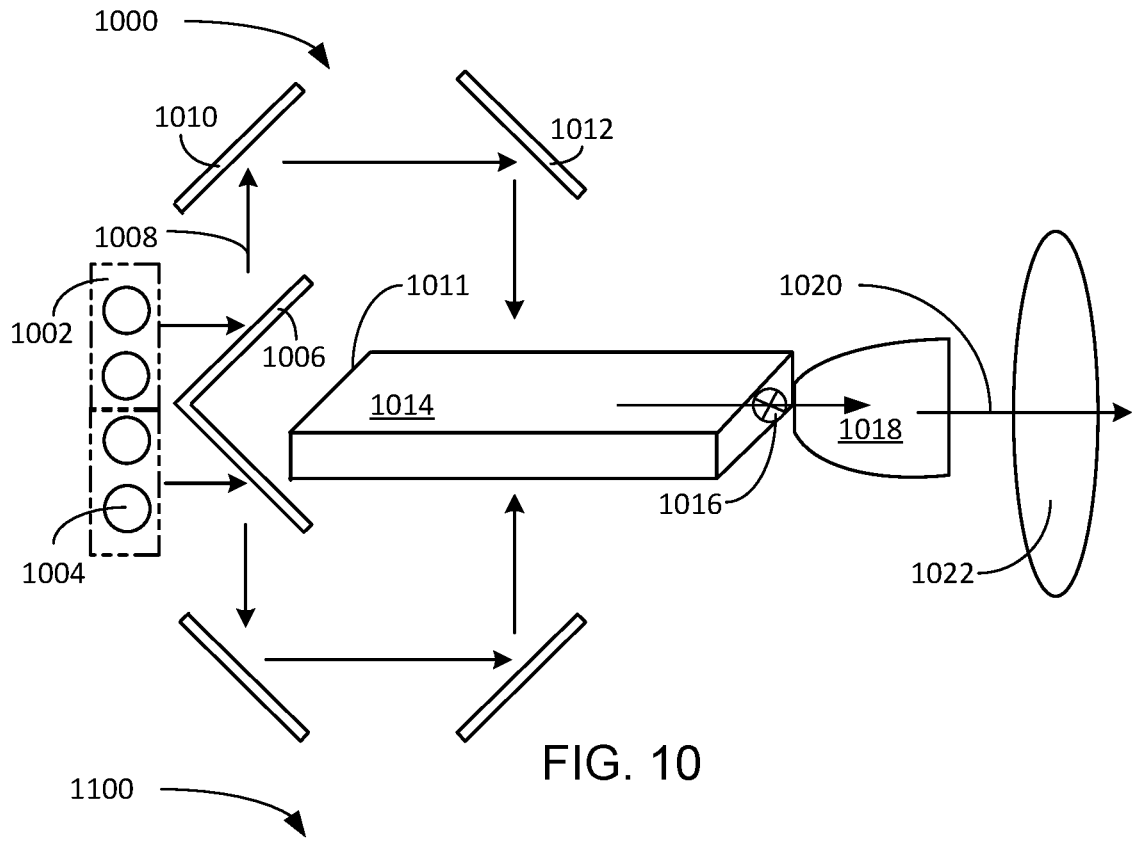
FIG. 10 is a functional block diagram of an illumination system with crystal phosphor mechanism in still another alternative embodiment.

Referring now to FIG. 10, therein is shown a functional block diagram of an illumination system 1000 with crystal phosphor mechanism in still another alternative embodiment. The functional block diagram of the illumination system 1000 depicts a laser assembly 1002 having lasers 1004 mounted on the laser assembly 1002. A mirror 1006 can be positioned relative to the laser assembly 1002, such that a laser light 1008 from the upper half of the laser assembly 1002 is deflected up and the lower half of the laser assembly 1002 produces the laser light 1008 that is deflected down so that it does not enter a base end 1011 of a crystal phosphor waveguide 1014.

A first turning mirror 1010 can be positioned at a 45 degree angle to reflect the laser light 1008 that was deflected up onto a horizontal path and a second turning mirror 1012 can be positioned to reflect the laser light 1008 onto the top surface of the crystal phosphor waveguide 1014. A complimentary path of the first turning mirror 1010 and the second turning mirror 1012 can be positioned beneath the crystal phosphor waveguide 1014 in order to reflect the laser light, that was deflected down by the mirror 1006, onto the bottom surface of the crystal phosphor waveguide 1014.

A luminescent light 1016 can be generated in the crystal phosphor waveguide 1014 and projected toward a compound parabolic concentrator (CPC) 1018. An output light 1020 can pass through a collimating lens 1022 for use by an application, such as a search light, a flash light, an entertainment light, emergency lighting, or the like. It is understood that the mirror 1006, the first turning mirror 1010, and the second turning mirror 1012 can be replaced by several of the turning prism 124 of FIG. 1.

Figure 11:
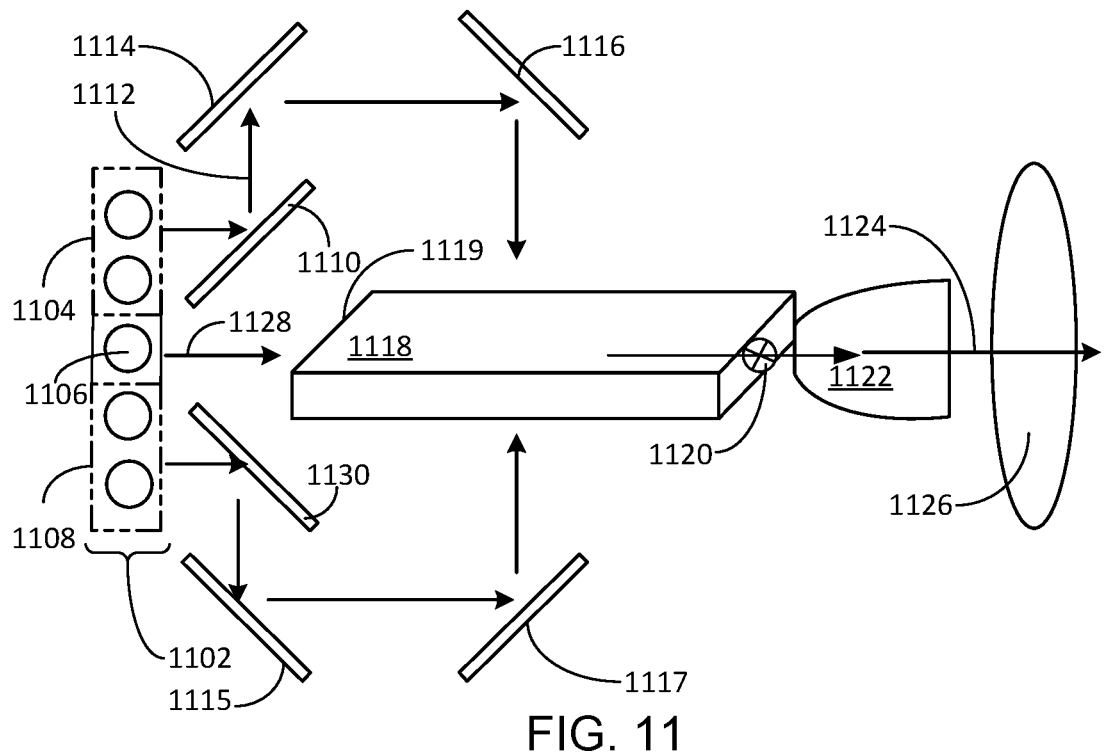
FIG. 11 is a functional block diagram of an illumination system with crystal phosphor mechanism in yet another alternative embodiment.

Referring now to FIG. 11, therein is shown a functional block diagram of an illumination system 1100 with crystal phosphor mechanism in yet another alternative embodiment. The functional block diagram of the illumination system 1100 depicts lasers 1102 configured to include upper side pumping lasers 1104, an end pumping laser 1106, and lower side pumping lasers 1108. An upward reflecting mirror 1110 can be positioned adjacent to the 2 upper side pumping lasers 1104 to deflect a laser light 1112 upward to a first turning mirror 1114. The first turning mirror can be positioned at an angle to reflect the laser light 1112 in a horizontal path to a second turning mirror 1116. The second turning mirror 1116 can be positioned to reflect the laser light 1112 onto an upper side of a crystal phosphor waveguide 1118.

The laser light 1112 can cause the crystal phosphor waveguide 1118 to generate a luminescent light 1120 and transmit it to a compound parabolic concentrator (CPC) 1122. An output light 1124 can be projected from the CPC 1122 to a collimating lens 1126.

The end pumping laser 1106 can project an end laser light 1128 onto a base end 1119 of the crystal phosphor waveguide 1118 in order to increase the amount of the luminescent light 1120 produced in the crystal phosphor waveguide 1118. The lower side pumping lasers 1108 can be positioned to project the laser light 1112 onto a downward reflecting mirror 1130 onto a complimentary set of a third turning mirror 1115 and a fourth turning mirror 1117 that are positioned to project the laser light 1112 onto the lower surface of the crystal phosphor waveguide 1118. The addition of the end pumping laser 1106 can increase the brightness of the luminescent light 1120 and the output light 1124.

It has been discovered that the illumination system 1100 can increase the brightness of the output light 1124 by pumping the crystal phosphor waveguide 1118 on three sides. This configuration can produce extremely bright output light 1124 for applications that require long distance lighting, such as search lights, entertainment lights, sports field lighting, and the like.

Figure 12:
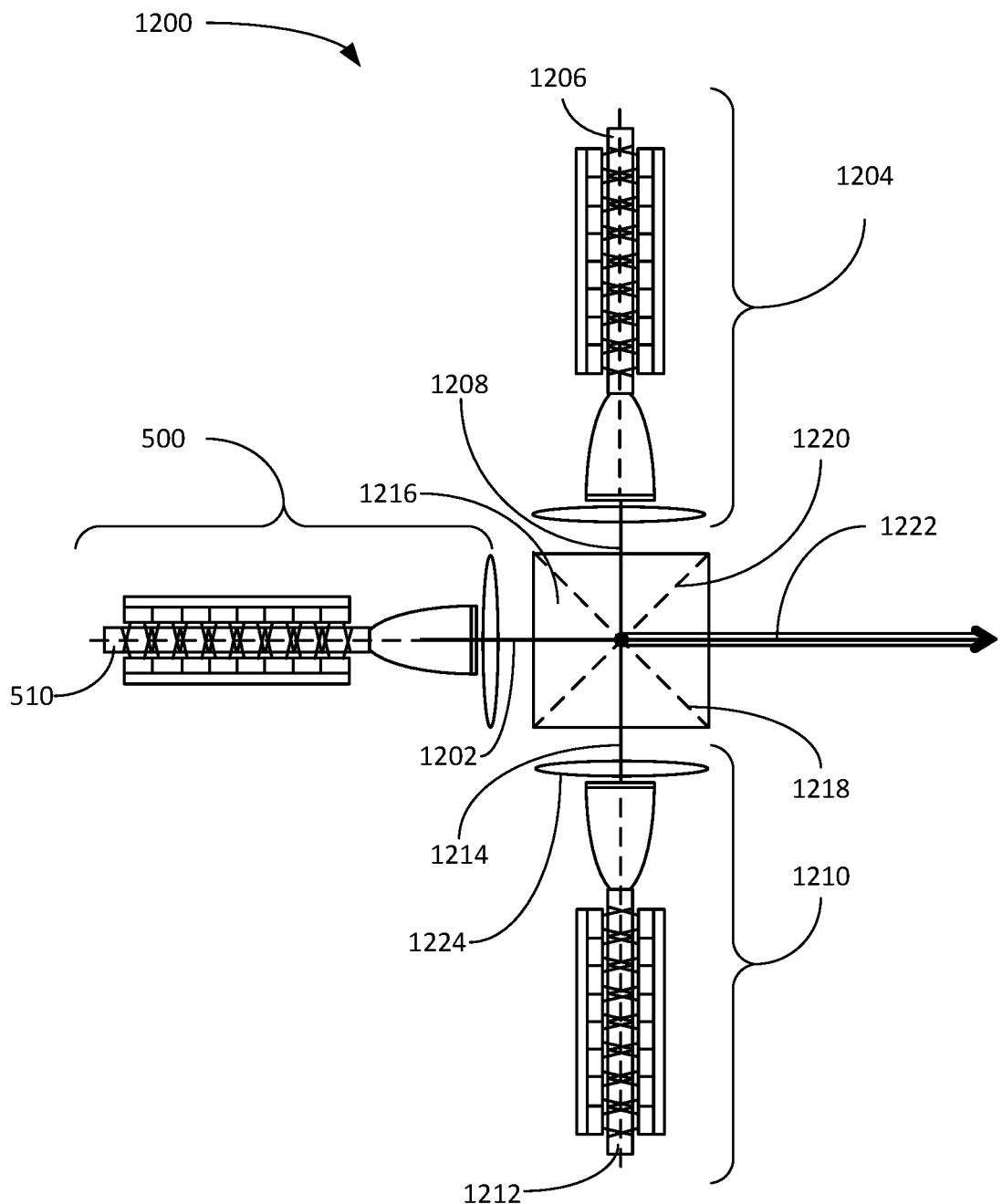
FIG. 12 is an example of a functional block diagram of an illumination system with double pumped crystal phosphor mechanism in an embodiment.

Referring now to FIG. 12, therein is shown an example of a functional block diagram of an illumination system 1200 with double pumped crystal phosphor mechanism in an embodiment. The functional block diagram of the illumination system 1200 depicts an application of the illumination system 500 utilizing the red crystal phosphor waveguide 510 of FIG. 5 to produce a red luminescent light 1202. A second illumination system 1204 can exchange the crystal phosphor waveguide 510 to be a blue crystal phosphor waveguide 1206 for generating a blue luminescent light 1208. A third illumination system 1210 can include a green crystal phosphor waveguide 1212 for producing a green luminescent light 1214.

An X-Cube 1216 can include a blue reflecting layer 1218 that can cause the blue luminescent light 1208 to turn 90 degrees inside the X-Cube 1216. A green reflective layer 1220 can also be included in the X-Cube 1216, for reflecting the green luminescent light 1214 90 degrees inside the X-Cube 1216. An output light 1222 can include the blue luminescent light 1208, the red luminescent light 1202, the green luminescent light 1214, or a combination thereof.

The outputs a red assembly 500, a green assembly 1210, and a blue assembly 1204 are combined together using the X-Cube 1216 to produce a single RGB output 1222. Each color assembly includes the laser array 502 of FIG. 5, collimating lenses 1224, and the compound parabolic concentrator (CPC) 520 of FIG. 5. The blue luminescent light 1208, the red luminescent light 1202, the green luminescent light 1214 are then collimated and directed into the X-Cube 1216 for the color combining operation.

It has been discovered that the illumination system 1200 can produce a high intensity red-green-blue (RGB) output that can represent the blue luminescent light 1208, the red luminescent light 1202, the green luminescent light 1214, or a combination thereof.

Referring now to FIG. 13, therein is shown a flow chart of a method 1300 of operation of an illumination system 100 in an embodiment of the present invention. The method 1300 includes: receiving a laser light, by a crystal phosphor waveguide, for generating of a luminescent light in a block 1302; directing the luminescent light away from a base end of the crystal phosphor waveguide in a block 1304; collecting the luminescent light from the crystal phosphor waveguide in a block 1306; and projecting the luminescent light away from the crystal phosphor waveguide in a block 1308.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An illumination system comprising:
   a laser configured to generate a laser light;
   a crystal phosphor waveguide, adjacent to the laser and in the laser light, configured to:
   generate a luminescent light based on receiving the laser light, and
   direct the luminescent light away from a base end; and
   a first compound parabolic concentrator (CPC), coupled to the crystal phosphor waveguide opposite the base end, configured to:
   collect the luminescent light from the crystal phosphor waveguide, and
   project the luminescent light away from the crystal phosphor waveguide;
   an additional laser array, adjacent to the crystal phosphor waveguide, configured to project a supplemental laser light on a side of the crystal phosphor waveguide opposite the laser; and a focusing lens, between the additional laser array and the crystal phosphor waveguide, configured to focus the supplemental laser light on the side of the crystal phosphor waveguide opposite the laser.

2. The system as claimed in claim 1, further comprising:
an illumination heat sink, adjacent to the crystal phosphor waveguide, configured to transfer heat away from the crystal phosphor waveguide.

3. The system as claimed in claim 1, further comprising:
an X-Cube, optically coupled to the luminescent light and a second luminescent light from a second CPC, configured to generate a multi-colored output;
a turning prism, optically coupled to the first CPC, configured to reflect the luminescent light into the X-Cube; and
an additional turning prism, optically coupled to a third CPC, configured to reflect a third luminescent light into the X-Cube; and
wherein the luminescent light, the second luminescent light, and the third luminescent light are one of a red luminescent light, a green luminescent light, and a blue luminescent light for generating the multi-colored output that provides a red-green-blue (RGB) output.

4. The system as claimed in claim 1, further comprising:
a second CPC;
a color-combining prism, optically coupled to the second CPC, configured to generate a multi-colored output, wherein the color-combining prism receives the second luminescent light from the second CPC, and wherein the first CPC is coupled to the color-combining prism through a first turning prism and a first waveguide; and
a third CPC, coupled to the color-combining prism through a second turning prism and a second waveguide, configured to receive a third luminescent light; and
wherein: the multi-colored output generated is a red-green-blue (RGB) output when the luminescent light, the second luminescent light and the third luminescent light are one of a red luminescent light, a green luminescent light and a blue luminescent light.

5. An illumination system comprising:
a laser configured to generate a laser light;
a crystal phosphor waveguide, adjacent to the laser and in the laser light, configured to:
    generate a luminescent light based on receiving the laser light, and
    direct the luminescent light away from a base end; and
a first compound parabolic concentrator (CPC), coupled to the crystal phosphor waveguide opposite the base end, configured to:
    collect the luminescent light from the crystal phosphor waveguide, and
    project the luminescent light away from the crystal phosphor waveguide;
an illumination heat sink, adjacent to the crystal phosphor waveguide, including a longitudinal concave reflector, formed in the illumination heat sink, configured to reflect the laser light to a side of the crystal phosphor waveguide; and
wherein the laser, mounted in the longitudinal concave reflector, includes a laser heat sink in direct contact with the illumination heat sink for dissipating the heat from the crystal phosphor waveguide and the laser.

6. An illumination system comprising:
lasers configured to generate laser light;
a crystal phosphor waveguide, adjacent to the lasers and in the laser light, configured to:
    generate a luminescent light based on receiving the laser light, and
    direct the luminescent light away from a base end; and
a compound parabolic concentrator (CPC), coupled to the crystal phosphor waveguide opposite the base end, configured to:
    collect the luminescent light from the crystal phosphor waveguide, and
    project the luminescent light away from the crystal phosphor waveguide;
wherein:
    the lasers include inner lasers and outboard lasers;
    the crystal phosphor waveguide is positioned under the inner lasers with the outboard lasers positioned past boundaries of the crystal phosphor waveguide; and
    the laser light from the outboard lasers is reflected into a side of the crystal phosphor waveguide by a mirror positioned at an angle to reflect the laser light from the outboard lasers into the crystal phosphor waveguide.

7. An illumination system comprising:
lasers configured to generate laser light;
a crystal phosphor waveguide, adjacent to the laser and in the laser light, configured to:
    generate a luminescent light based on receiving the laser light, and
    direct the luminescent light away from a base end; and
a compound parabolic concentrator (CPC), coupled to the crystal phosphor waveguide opposite the base end, configured to:
    collect the luminescent light from the crystal phosphor waveguide, and
    project the luminescent light away from the crystal phosphor waveguide;
wherein:
    the lasers include inner lasers and outboard lasers;
    the crystal phosphor waveguide is positioned under the inner lasers with the outboard lasers positioned past boundaries of the crystal phosphor waveguide; and
    the laser light from the outboard lasers is reflected into a side of the crystal phosphor waveguide by a turning prism abutting the crystal phosphor waveguide to reflect the laser light from the outboard lasers into the crystal phosphor waveguide.

8. An illumination system comprising:
a laser configured to generate a laser light;
a crystal phosphor waveguide, adjacent to the laser and in the laser light, configured to:
    generate a luminescent light based on receiving the laser light, and
    direct the luminescent light away from a base end; and
a compound parabolic concentrator (CPC), coupled to the crystal phosphor waveguide opposite the base end, configured to:
    collect the luminescent light from the crystal phosphor waveguide, and
    project the luminescent light away from the crystal phosphor waveguide;
wherein:
    the lasers include upper side pumping lasers, an end pumping laser, and lower side pumping lasers activated away from the crystal phosphor waveguide; and
    the system further comprising:
    an upward deflecting mirror, positioned in front of the upper side pumping lasers, configured to deflect the laser light;

a first turning mirror, aligned with a second turning mirror, configured to reflect the laser light from the upward deflecting mirror to the upper side of the crystal phosphor waveguide;
a downward deflecting mirror positioned in front of the lower side pumping lasers;
a third turning mirror, aligned with a fourth turning mirror, configured to reflect the laser light from the downward deflecting mirror to the lower side of the crystal phosphor waveguide; and
the end pumping laser, aligned with a base end of the crystal phosphor waveguide, configured to project an end laser light onto the base end of the crystal phosphor waveguide for generating the luminescent light.

9. The system as claimed in claim 1 further comprising:
an X-Cube, optically coupled to the luminescent light, a second luminescent light, a third luminescent light, or a combination thereof, configured to generate a multi-colored output; and
wherein:
the X-Cube is further configured to include a blue reflecting layer, configured to reflect the second luminescent light toward the multi-colored output, a green reflective layer configured to reflect the third luminescent light toward the multi-colored output, and the X-Cube further configured to pass the laser light to the multi-colored output without reflecting the luminescent light; and
the multi-colored output configured as a red-green-blue (RGB) output when the luminescent light, the second luminescent light, and the third luminescent light are one of a red luminescent light, a blue luminescent light, or a green luminescent light.

10. An illumination system comprising:
a laser configured to generate a laser light;
a crystal phosphor waveguide, adjacent to the laser and in the laser light, configured to:
generate a luminescent light based on receiving the laser light, and
direct the luminescent light away from a base end;
a compound parabolic concentrator (CPC), coupled to the crystal phosphor waveguide opposite the base end, configured to:
collect the luminescent light from the crystal phosphor waveguide, and
project the luminescent light away from the crystal phosphor waveguide;
an additional laser array, adjacent to the crystal phosphor waveguide, configured to project a supplemental laser light on a side of the crystal phosphor waveguide opposite the laser;
an illumination heat sink, attached to the crystal phosphor waveguide, including a reflective surface between the additional laser array and the crystal phosphor waveguide for reflecting the supplemental laser light into the crystal phosphor waveguide; and
a cylindrical lens, between the additional laser array and the crystal phosphor waveguide, configured to focus the supplemental laser light on the side of the crystal phosphor waveguide opposite the laser.

11. An illumination system comprising:
a laser configured to generate a laser light;
a crystal phosphor waveguide, adjacent to the laser and in the laser light, configured to:
generate a luminescent light based on receiving the laser light, and
direct the luminescent light away from a base end;
a compound parabolic concentrator (CPC), coupled to the crystal phosphor waveguide opposite the base end, configured to:
collect the luminescent light from the crystal phosphor waveguide, and
project the luminescent light away from the crystal phosphor waveguide;
an illumination heat sink, adjacent to the crystal phosphor waveguide, including a polished concave surface, formed as a compound parabolic concentrator (CPC) in the illumination heat sink, configured to reflect the laser light to a side of the crystal phosphor waveguide, wherein the laser is mounted in the polished concave surface, and includes a laser heat sink in direct contact with the illumination heat sink for dissipating the heat from the crystal phosphor waveguide and the laser.

12. A method for operating an illumination system comprising:
receiving a laser light, into a crystal phosphor waveguide, for generating a luminescent light, wherein the laser light comes from a laser array assembly;
directing the luminescent light away from a reflective layer of the crystal phosphor waveguide;
collecting the luminescent light from the crystal phosphor waveguide using a first compound parabolic concentrator (CPC);
projecting the luminescent light away from the crystal phosphor waveguide using the first CPC;
projecting a supplemental laser light on a side of the crystal phosphor waveguide opposite the laser array assembly; and
focusing the supplemental laser light on the side of the crystal phosphor waveguide opposite the laser array assembly.

13. The method as claimed in claim 12 further comprising:
transferring heat away from the crystal phosphor waveguide by an illumination heat sink.

14. A method for operating an illumination system comprising:
receiving a laser light, into a crystal phosphor waveguide, for generating a luminescent light, wherein the laser light comes from a laser array assembly;
directing the luminescent light away from a reflective layer of the crystal phosphor waveguide;
collecting the luminescent light from the crystal phosphor waveguide;
projecting the luminescent light away from the crystal phosphor waveguide;
reflecting the laser light, to a side of the crystal phosphor waveguide, by a longitudinal concave reflector formed in an illumination heat sink; and
dissipating the heat from the crystal phosphor waveguide and the laser array assembly.

15. The method as claimed in claim 12, further comprising:
generating a multi-colored output by an X-Cube including coupling the X-Cube to a second luminescent light from a second CPC;
reflecting the luminescent light into the X-Cube by a turning prism coupled to the first CPC; and
reflecting a third luminescent light into the X-Cube by an additional turning prism coupled to a third CPC; and
wherein:
generating the multi-colored output includes generating a red-green-blue (RGB) output when the luminescent light, the second luminescent light, and the third luminescent light are a red luminescent light, a green luminescent light, and a blue luminescent light.

16. The method as claimed in claim 12, further comprising:
generating a multi-colored output by a color-combining prism, wherein the generating of the multi-colored output includes:
receiving a second luminescent light from a second CPC into the color combining prism,
receiving the luminescent light through the first CPC to the color combining prism through a first turning prism and a first waveguide, and
receiving a third luminescent light through a third CPC to the color combining prism through a second turning prism and a second waveguide; and
wherein:
generating the multi-colored output includes generating a red-green-blue (RGB) output when the luminescent light, the second luminescent light and the third luminescent light are one of a red luminescent light, a green luminescent light and a blue luminescent light.

17. A method for operating an illumination system comprising:
receiving a laser light, into a crystal phosphor waveguide, for generating a luminescent light, wherein the laser light comes from a laser array assembly having inner lasers and outboard lasers;
directing the luminescent light away from a reflective layer of the crystal phosphor waveguide;
collecting the luminescent light from the crystal phosphor waveguide;
projecting the luminescent light away from the crystal phosphor waveguide;
positioning the laser array assembly with the inner lasers over the crystal phosphor waveguide and the outboard lasers positioned past boundaries of the crystal phosphor waveguide; and
reflecting the outboard lasers, into a side of the crystal phosphor waveguide, by a mirror positioned at an angle for reflecting the laser light from the outboard lasers into the crystal phosphor waveguide.

18. A method for operating an illumination system comprising:
receiving a laser light, into a crystal phosphor waveguide, for generating a luminescent light, wherein the laser light comes from a laser array assembly having inner lasers and outboard lasers;
directing the luminescent light away from a reflective layer of the crystal phosphor waveguide;
collecting the luminescent light from the crystal phosphor waveguide;
projecting the luminescent light away from the crystal phosphor waveguide;
positioning the laser array assembly with the inner lasers over the crystal phosphor waveguide and the outboard lasers positioned past boundaries of the crystal phosphor waveguide; and
reflecting the laser light from the outboard lasers, into a side of the crystal phosphor waveguide, by a turning prism abutting the crystal phosphor waveguide to reflect the laser light from the outboard lasers into the crystal phosphor waveguide.

19. A method for operating an illumination system comprising:
receiving a laser light, into a crystal phosphor waveguide, for generating a luminescent light;
directing the luminescent light away from a reflective layer of the crystal phosphor waveguide;
collecting the luminescent light from the crystal phosphor waveguide;
projecting the luminescent light away from the crystal phosphor waveguide;
activating upper side pumping lasers, an end pumping laser, and lower side pumping lasers with the laser array assembly spaced away from the crystal phosphor waveguide;
deflecting the laser light includes positioning an upward deflecting mirror in front of the upper side pumping lasers;
reflecting the laser light from the upward deflecting mirror to the upper side of the crystal phosphor waveguide by aligning a first turning mirror with a second turning mirror;
deflecting the lower side pumping lasers with a downward deflecting mirror;
reflecting the laser light from downward deflecting mirror to the lower side of the crystal phosphor waveguide by aligning a third turning mirror and a fourth turning mirror with the downward deflecting mirror; and
projecting an end laser light onto an end of the crystal phosphor waveguide for generating the luminescent light.

20. The method as claimed in claim 13, further comprising:
generating a multi-colored output by an X-Cube optically coupled to the luminescent light, a second luminescent light, a third luminescent light, or a combination thereof; and
wherein:
reflecting the second luminescent light toward the multi-colored output, by a blue reflecting layer;
reflecting the third luminescent light toward the multi-colored output, by a green reflective layer;
passing the laser light to the multi-colored output without reflecting the luminescent light; and
generating a red-green-blue (RGB) output as the multi-colored output when the luminescent light, the second luminescent light, and the third luminescent light are one of a red luminescent light, a blue luminescent light, or a green luminescent light.

21. A method for operating an illumination system comprising:
receiving a laser light, into a first side of a crystal phosphor waveguide, for generating a luminescent light;
directing the luminescent light away from a reflective layer of the crystal phosphor waveguide;
collecting the luminescent light from the crystal phosphor waveguide;
projecting the luminescent light away from the crystal phosphor waveguide;
projecting a supplemental laser light toward a second side of the crystal phosphor waveguide opposite the first side; and
focusing the supplemental laser light into the second side of the crystal phosphor waveguide, wherein the focusing includes illuminating a cylindrical lens between the projected supplemental laser light and the crystal phosphor waveguide.

22. A method for operating an illumination system comprising:
receiving a laser light, into a crystal phosphor waveguide, for generating a luminescent light, wherein the laser light comes from a laser array assembly;
directing the luminescent light away from a reflective layer of the crystal phosphor waveguide;
collecting the luminescent light from the crystal phosphor waveguide;
projecting the luminescent light away from the crystal phosphor waveguide;

reflecting the laser light, to a side of the crystal phosphor waveguide, by a polished concave surface, formed as a compound parabolic concentrator (CPC) in an illumination heat sink; and dissipating the heat from the crystal phosphor waveguide and the laser array assembly.

23. The system as claimed in claim 5, further comprising:

an additional laser array, adjacent to the crystal phosphor waveguide, configured to project a supplemental laser light into a side of the crystal phosphor waveguide opposite the laser.

24. The system as claimed in claim 5, further comprising:

an X-Cube, optically coupled to the luminescent light and a second luminescent light from a second CPC, configured to generate a multi-colored output;

a turning prism, optically coupled to the first CPC, configured to reflect the luminescent light into the X-Cube;

an additional turning prism, optically coupled to a third CPC, configured to reflect a third luminescent light into the X-Cube; and wherein the luminescent light, the second luminescent light, and the third luminescent light are one of a red luminescent light, a green luminescent light, and a blue luminescent light for generating the multi-colored output that provides a red-green-blue (RGB) output.

* * * * *